(12) United States Patent
Varkey et al.

(10) Patent No.: US 7,324,730 B2
(45) Date of Patent: Jan. 29, 2008

(54) OPTICAL FIBER CABLES FOR WELLBORE APPLICATIONS

(75) Inventors: Joseph Varkey, Missouri City, TX (US); Ravicharan Mydur, Stafford, TX (US); Noor Sait, Shekou-Shenzhen (CH); Willem Wijnberg, Houston, TX (US); Sumitra Kunathikom, Stafford, TX (US); Monica Darpi, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 318 days.

(21) Appl. No.: 10/931,736

(22) Filed: Sep. 1, 2004

(65) Prior Publication Data

US 2006/0045442 A1 Mar. 2, 2006

Related U.S. Application Data

(60) Provisional application No. 60/572,396, filed on May 19, 2004.

(51) Int. Cl.
*G02B 6/44* (2006.01)
(52) U.S. Cl. .............. 385/102; 385/100; 385/101; 385/103; 385/104; 385/106; 385/107
(58) Field of Classification Search ........ 385/100–104, 385/106–107
See application file for complete search history.

(56) References Cited

U.S. PATENT DOCUMENTS

| 4,375,313 | A | 3/1983 | Anderson | 350/96.23 |
|---|---|---|---|---|
| 4,522,464 | A | 6/1985 | Thompson | 350/96.23 |
| 4,696,542 | A | 9/1987 | Thompson | 350/96.23 |
| 5,115,485 | A | 5/1992 | Gandy | 385/101 |
| 5,202,944 | A | 4/1993 | Riordan | 385/101 |
| 5,495,547 | A * | 2/1996 | Rafie et al. | 385/101 |
| 6,009,216 | A | 12/1999 | Pruett et al. | 385/12 |
| 6,060,662 | A | 5/2000 | Rafie | 174/106 |
| 6,192,983 | B1 | 2/2001 | Neuroth et al. | 166/250.15 |
| 6,281,489 | B1 | 8/2001 | Tubel | 250/227.14 |
| 6,392,151 | B1 | 5/2002 | Rafie | 174/106 |
| 6,400,873 | B1 | 6/2002 | Gimblet et al. | 385/102 |
| 6,531,694 | B2 | 3/2003 | Tubel | 250/227 |
| 6,600,108 | B1 | 7/2003 | Mydur | 174/120 |
| 6,714,708 | B2 | 3/2004 | McAlpine et al. | 385/110 |
| 6,779,927 | B2 | 8/2004 | Cens | 385/84 |
| 2004/0045735 | A1 | 3/2004 | Varkey | 174/120 |

FOREIGN PATENT DOCUMENTS

| GB | 2275953 | 9/1994 |
|---|---|---|
| WO | WO 96/41066 | 12/1996 |

\* cited by examiner

*Primary Examiner*—Frank G. Font
*Assistant Examiner*—Michael P. Mooney
(74) *Attorney, Agent, or Firm*—David Cate; Michael Flynn; Jaime Castano

(57) ABSTRACT

A cable which includes conductor bundles prepared from at least one optical fiber positioned either centrally or helically about the center axis of the bundle, metallic conductors helically positioned around the bundles center axis, and a polymeric insulation material. A method of making a cable including forming a conductor bundle by placing helically positioned conductors and optical fibers about the periphery of a central optical fiber or metallic conductor, encasing the conductors, optical fibers, in a polymeric insulation material, and grouping the conductor bundles together.

13 Claims, 4 Drawing Sheets

OPTICAL FIBER CABLES FOR WELLBORE APPLICATIONS

This patent application is a non-provisional application of provisional application Ser. No. 60/572,396 filed May 19, 2004.

BACKGROUND OF THE INVENTION

1. Field of the Invention

This invention relates to electrical and/or optical cables and, in particular to wireline cables having optical fiber(s) therein.

2. Description of the Related Art

In the petroleum industry, wireline cables are used to support tools, provide power, and collect data downhole from well-bores. In the case of data collection, the use of optical fibers in electric and/or optical cable offers the potential to carry greater amounts of information than conventional conductors. This is important since at a set diameter, factors such as maximizing data transfer, cable strength, power capacity, and environmental durability are critical to optimum cable design. Optical fibers present certain difficulties such as degradation due to hydrogen exposure, particularly at high temperatures, lack of comparable stretch/strain characteristics as compared with other cable elements, the possibility of volatilization of volatile organic compounds (VOCs) in coatings or other polymeric protective layers on the optical fibers, and hydrolytic attack against glass in the presence of water.

Electrical and/or optical cables, such as those used in oilfield wireline operations, often include members that provide tensile strength to the cables. Historically, one or more layers of wire comprising a plough or ferritic steel are applied to the outer surfaces of such cables to form strength members. Metallic strength members in cables stretch under load and then return to their original length. Polymeric (un-crosslinked) materials in wireline cables stretch but do not return to their original lengths. Existing designs for fiber optic conductors used in wireline cables have incorporated several measures to protect the fiber optic elements. For example, Schlumberger's patent "Fiber Optic Cable and Core" (U.S. Pat. No. 4,375,313) places helically wound optical fibers around a polymeric core with additional polymeric material applied over the optical fibers. In this type of design, the polymeric material stretches along with the strength members, and the optical fibers' helical configuration allows them to extend with that stretch. However, when the elongation stress is removed from the cable the polymeric material does not return to its original length, which leads to local stress points and causes signal attenuation. Optical fibers have markedly different deformation characteristics than a cable's metallic strength members and limited ability to stretch. Thus, a typical mechanical limitation for acceptable performance of optical fiber based cables is the amount of stretch a cable can withstand. The present invention provides cables comprising optical fiber(s) in conjunction with metallic conductors in configurations that avoid mechanical and durability limitations present in the prior art.

BRIEF SUMMARY OF THE INVENTION

In one aspect of the present invention, a cable is provided which includes conductor bundles prepared from at least one optical fiber positioned either centrally or helically about the center axis of the bundle, metallic conductors helically positioned around the bundles center axis, and a polymeric insulation material.

In another aspect of the present invention, provided is a cable including a conduit formed from keystone shaped metallic conductors, which surrounds one or more optical fibers and an interstitial filler of low-volatility grease or any suitable gel, and an insulation layer disposed around the tube.

All of the cable of the invention may optionally include jackets that in a first case surround outer conductors of the conductor bundles and are encased with a polymeric insulating material, or in a second case, the jackets encase the outer periphery of polymeric insulating material.

A method for making a cable is also provided. The method includes forming a conductor bundle by placing helically positioned conductors and optical fibers about the periphery of a central optical fiber or metallic conductor, encasing the conductors, optical fibers, in a polymeric insulation material, and grouping the conductor bundles together.

DETAILED DESCRIPTION OF THE INVENTION

Figure 1:
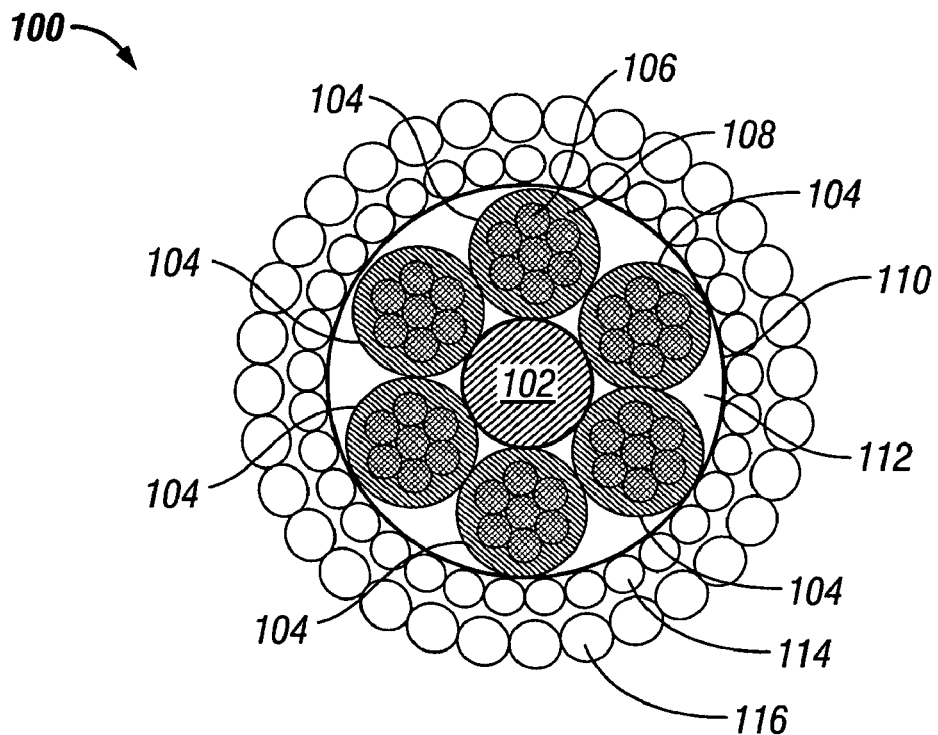
FIG. 1 is a cross-sectional view of a typical prior art cable design.

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time consuming, but would nevertheless be a routine undertaking for those of ordinary skill in the art having the benefit of this disclosure.

The present invention relates to the wireline cables having optical fiber(s) used in conjunction with metallic conductors and uses thereof, particularly for oilfield applications. In general, the metallic conductors are insulated. Commercially available metallic conductors may be used in the present invention. In some embodiments, the metallic conductors are copper. Any cross sectional shape of metallic conductors may be used in the cables of the present invention. Examples of shapes include, but are not limited to, triangular, round, irregular, square, rhombic, trapezoidal, flat, cigar, oval, arch, rectangular, keystone, teardrop, wedge, and the like.

Any commercially available optical fibers may be used in the present invention. The optical fibers may be single-mode fibers or multi-mode fibers, which are either hermetically coated or non-coated. When hermetically coated, a carbon or metallic coating is typically applied over the optical fibers. Optionally, a further secondary coating, such as, but not limited to, acrylic coatings, silicon/PFA coatings, or polyimide coatings, may be applied over the hermetic coating. An optical fiber may be placed in any location in a standard wireline cable core configuration. Optical fibers may be placed centrally or helically in the cable.

Placing optical fibers in various positions and areas of the cable creates a wide variety of means to monitor well bore activity and conditions. When the optical fiber is placed in a helical position inside the cable, measurements of downhole physical properties, such as temperature or pressure, among many others, are quickly acquired. Conversely, placing the optical fiber in a central position upon the center axis of the cable allows for strain measurements, although this position may not enable quick physical property measurements.

Optical fibers are desirable for high data rate transfer, for example 10 Mbps to 1 Gbps versus typically 500 kbps to 1 Mbps for copper conductors. Optical fibers may also enable better separation of power and data transmission, as well as avoiding cross-talk problems associated with metallic conductors.

A typical technique to introduce optical fibers into wireline cables is using a metal (i.e. stainless steel) tube to contain the optical fibers, as optical fibers are fragile and prone to damage and degradation. Where metallic tubes are used to protect the fibers, the tubes must be strong enough to withstand pressures of up to 207 MPa and temperatures of 320° C. Unfortunately, the size required for this strength and durability deprives valuable space from wireline cable designs, thereby displacing conductor space. Also, such tubes may be damaged when they are pulled over sheaves at very high pull loads. The present invention allows optical fibers to be put in the helical or central conductor of any wireline cable configuration without the need for a metallic tube.

Also, metallic tubes have limited fatigue life and elastic stretch, typically no more than 0.4%. As the present invention eliminates the need for metal tubes, stretch length may be increased to greater than 1.5%. Further, the use of metallic tubes limits the number of optical fibers that can be contained in a cable. As the present invention eliminates the need for a metal tube, the number of optical fibers may be increased while maintaining or increasing power capacity.

Also, often optical fibers require splicing when the cable is damaged downhole. When, optical fibers are encased in a metal tube, splicing is not practically feasible. The present invention also overcomes this limitation and enables splicing of the optical fiber at any point along the wireline cable.

In the embodiments according to the present invention, optical fibers or metallic conductors are placed at the center of helically wrapped conductor bundles. This central metallic conductor or optical fiber is then wrapped with helically positioned metallic conductors and/or optical fibers to create larger conductor bundles, and a polymeric insulation material may encase the bundle. The conductor bundles may then be combined with other conductor bundles to form a cable. In variations of this design, the optical fiber/metallic conductor bundles may be combined with separate helical optical fibers. Metallic wires of any suitable size, or even yarns may be included in the bundles or cables formed from the bundles. Wires and yarns provide compression resistance, and wires may supply additional current capacity. Preferably, the metallic wires are copper conductors. Various configurations of these embodiments may be used to provide attributes such as enhanced packing efficiency, more metallic conductor capacity, greater numbers of optical fibers, and improved stretch characteristics.

Embodiments of the present invention typically include one or more polymeric insulation materials surrounding outer conductors of a conductor bundle that is capable of withstanding high temperatures. Such materials may include, but are not necessarily limited to, the polyaryletherether ketone family of polymers (PEEK, PEKK), polyolefins (EPC, TPX), fluoropolymers (ETFE, PFA, MFA), or the like. The polymeric insulation material may also be a stacked dielectric, such as those described in U.S. Pat. No. 6,600,108 (Mydur, et al.), hereinafter incorporated by reference.

Interstitial fillers may further be included in embodiments of the present invention. Interstitial fillers typically occupy those interstitial spaces between the central or outer conductors/optical fibers within a conductor bundle. Interstitial fillers may also occupy interstitial spaces formed between a plurality of conductor bundles, or even between conductor bundles and an outer jacket, such as a tape jacket. Examples of suitable interstitial fillers include ethylene propylene diene monomer (EPDM), nitrile rubber, polyisobutylene, low volatility grease (such as Krytox®), fluoroelastomers, metallic conductors, wires, yarns (TFE, cotton, polyester), any suitable gel, or any combination thereof.

FIG. 1 depicts a cross-section of a typical cable design used for downhole applications. The cable 100 includes a central conductor bundle 102 having multiple conductors and an outer polymeric insulating material. The cable 100 further includes a plurality of outer conductor bundles 104, each having several metallic conductors 106 (only one indicated), and a polymeric insulating material 108 (only one indicated) surrounding the outer metallic conductors 106. Commonly, the metallic conductor 106 is a copper conductor. The central conductor bundle 102 of a typical prior art cables, is essentially the same design as the outer conductor bundles 104. A tape and/or tape jacket 110 made of a material that may be either electrically conductive or electrically non-conductive and that is capable of withstanding high temperatures encircles the outer conductor bundles 104. The volume within the tape and/or tape jacket 110 not taken by the central conductor bundle 102 and the outer conductors 104 is filled by a filler 112, which may be made of either an electrically conductive or an electrically non-conductive material. A first armor layer 114 and a second armor layer 116, generally made of a high tensile strength material such as galvanized improved plow steel, alloy steel, or the like, surround and protect the tape and/or tape jacket 110, the filler 112, the outer conductor bundles 104, and the central conductor bundle 102.

Figure 2:
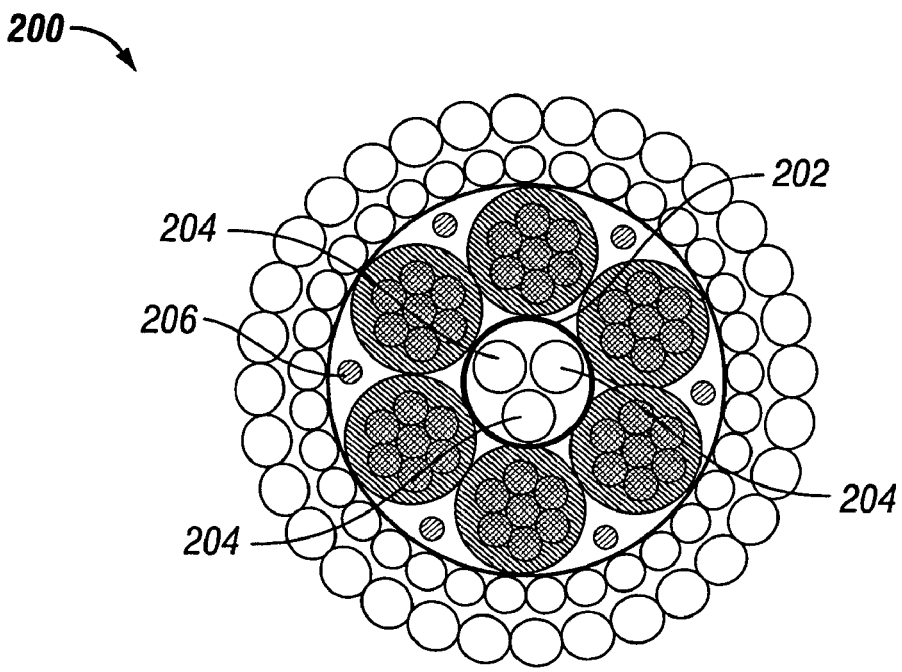
FIG. 2 is a cross-sectional view of a prior art optical fiber based cable design.

FIG. 2 illustrates a prior art optical fiber based cable designed for oilfield use. The cable 200 replaces the central conductor bundle 102 of FIG. 1 with a metallic tube 202 containing one or more optical fibers 204 (three shown). The optical fibers 204 are encased in a metal tube 202, designed to protect the optical fibers 204. Further, the cable 200 commonly includes interstitial fillers 206 (only one indicated), such as a yarn, to provide compression resistance. While the metal tube 202 offers limited protection, metal tubes are known to be susceptible to mechanical damage, such as plastic stretching, bundling, or cracking, which then leads to cable failure from exposure to conditions presented during downhole deployment. The present invention overcomes this limitation by eliminating the need for such designs.

Figure 3:
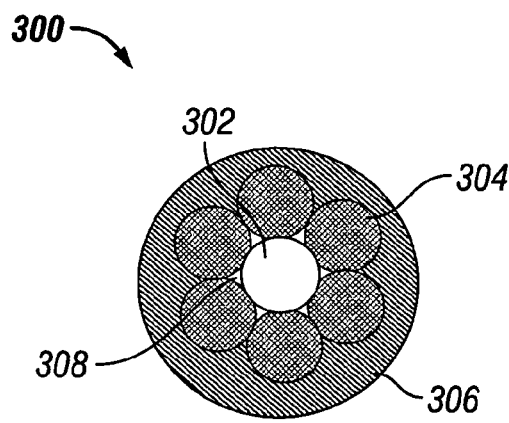
FIG. 3 is a cross-sectional view of a first illustrative embodiment of a cable conductor bundle according to the present invention.

FIG. 3 illustrates, in cross section, a first embodiment of an optical fiber conductor bundle according to the present invention. The conductor bundle 300 includes an optical fiber 302 centrally positioned on the center axis of the conductor bundle 300, and a plurality of metallic conductors 304 (only one indicated) helically positioned around the optical fiber 302. A polymeric insulating material 306 surrounds the metallic conductors 304. Further, the volume between the optical fiber 302 and metallic conductors 304 may be filled with an interstitial filler 308. The conductor bundle 300 may serve as a central conductor bundle, such as the conductor bundle 102 of cable 100 as depicted in FIG. 1. Also, the conductor bundle 300 may be positioned in a cable as one or more outer conductor bundles, for example, by replacing the outer conductor bundles 104 in FIG. 1.

Figure 4:
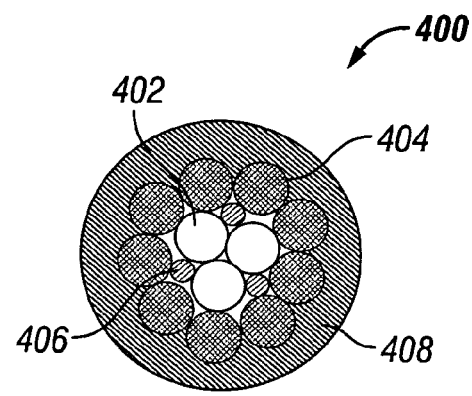
FIG. 4 is a cross-sectional view of a second illustrative embodiment of a cable conductor bundle according to the present invention.

FIG. 4 is a cross-sectional view of a second illustrative embodiment of the present invention. The conductor bundle 400 has a plurality of optical fibers 402 (only one indicated) positioned at zero lay angle or any suitable lay angle relative to the center axis of cable 400, and a plurality of metallic conductors 404 (only one indicated) surrounding the optical fibers 402, wherein the metallic conductors are positioned at any suitable helical angle. Conductor bundle 400 further contains interstitial fillers 406 (only one indicated), which are preferably yarns, more preferably TFE yarns, as interstitial fillers to round out the center of the conductor bundle 400 and provide compression resistance. The metallic conductors 404 are encased in a polymeric insulating material 408. As is the case with conductor bundle 300 in FIG. 3, conductor bundle 400 may serve as a central and/or outer conductor bundle when used to prepare a cable.

Figure 5:
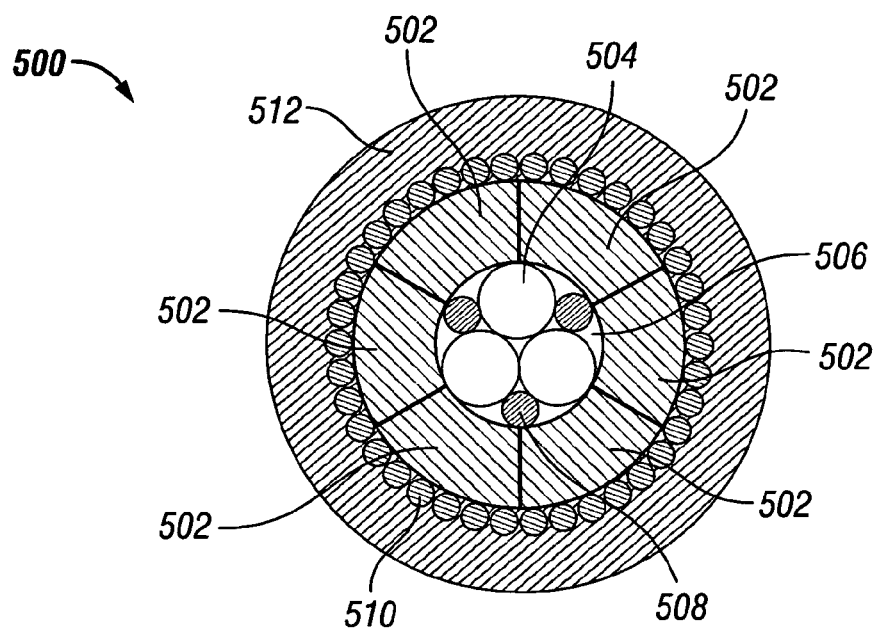
FIG. 5 is a cross-sectional view of a third illustrative embodiment of a cable conductor bundle according to the present invention.

FIG. 5 represents by cross-section a third illustrative embodiment of a cable according to the present invention. A conductor bundle 500 is formed from keystone shaped metallic wires 502 to form a conductor with a space for optical fibers 504 (only one indicated) and other components at the center of the conductor bundle 500, as well as providing a compression and collapse resistant conduit that protects the optical fibers 504. The keystone shaped metallic wires 502 preferably are copper wires, and may be coated with a nickel coating, or any suitable coating, for environmental resistance. One or more optical fibers 504 are then contained in the collapse resistant conduit formed by the keystone shaped wires 502. The optical fiber(s) 504 may be positioned upon or parallel to the center axis, and orientated at a zero lay angle, or any suitable helical angle. The volume between the optical fiber(s) 504 and keystone shaped metallic wires 502 may be filled with interstitial fillers 506. Preferably, the interstitial filler 506 is a low volatility compression resistant grease, such as Krytox®, any suitable gel material, or any other low volatility interstitial filler. Further, other interstitial fillers 508, such as yarns (only one indicated), preferably TFE yarns, may be run in the tube as well. Small copper conductors 510 (only one indicated) may be served around keystone shaped metallic wires 502, and a polymeric insulation material 512 may be extruded over the exterior to encase and protect the conductor bundle 500.

Figure 6:
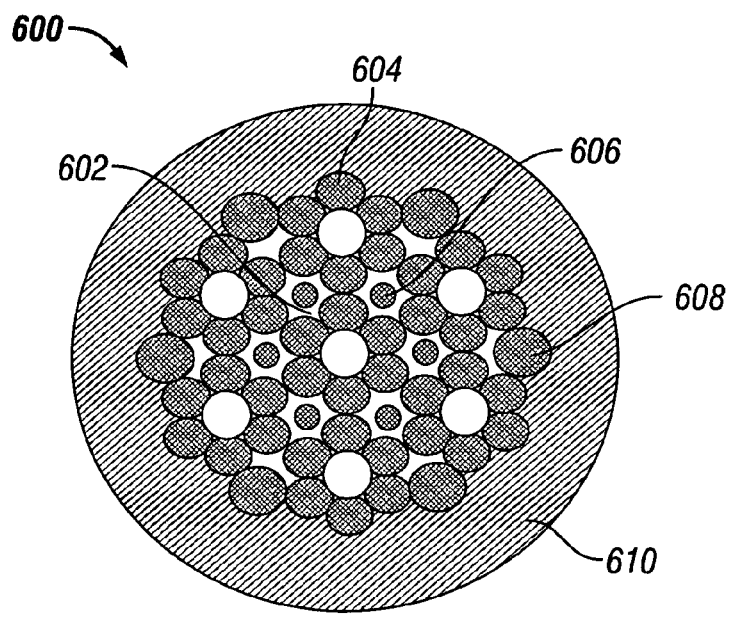
FIG. 6 is a cross-sectional view of a fourth illustrative embodiment of a cable according to the present invention.

FIG. 6 depicts, in cross-section, a fourth illustrative embodiment of the present invention. The conductor bundle 600 is a composite of smaller conductor bundles containing optical fibers. The conductor bundle 600 includes a central conductor bundle 602 and a plurality of outer conductor bundles 604 (only one indicated). The optical fibers and metallic conductors of the central conductor bundle 602 and outer conductor bundles 604 are configured as described by conductor bundle 300 as depicted in FIG. 3, with the exception that they do not have a polymeric insulating material 306 disposed about the outer conductors 304. Metallic conductors 606 (only one indicated) and 608 (only one indicated) are disposed about the interstitial space of the conductor bundle 600 to provide additional compression resistance and conductor capacity. A polymeric insulation material 610 encases the outer conductor bundles 604 and metallic conductors 608. The conductor bundle 600 may be used as both central and outer conductor bundles in the configuration of a cable.

Figure 7:
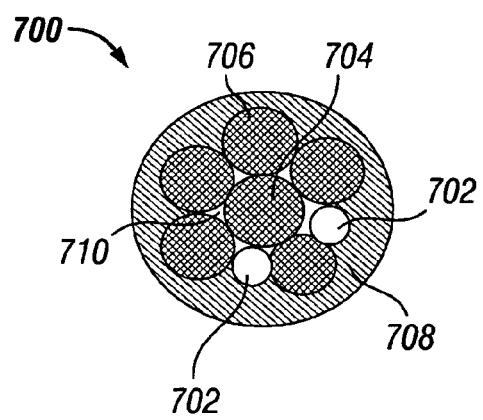
FIG. 7 is a cross-sectional view of a fifth illustrative embodiment of a cable conductor bundle according to the present invention.

In the embodiment illustrated in FIG. 7, the conductor bundle 700 includes optical fibers 702 helically positioned around a central metallic conductor 704. A plurality of metal conductors 706 (only one indicated) helically surround the central metallic conductor 704. The metal conductors 706 and optical fibers 702 are surrounded with a polymeric insulation material 708. The interstitial space 710 formed between the central metallic conductor 704, the metal conductors 706, and optical fibers 702, may further be filled with an interstitial filler. The conductor bundle 700 may be used as central and outer conductor bundles in the configuration of a cable.

Figure 8:
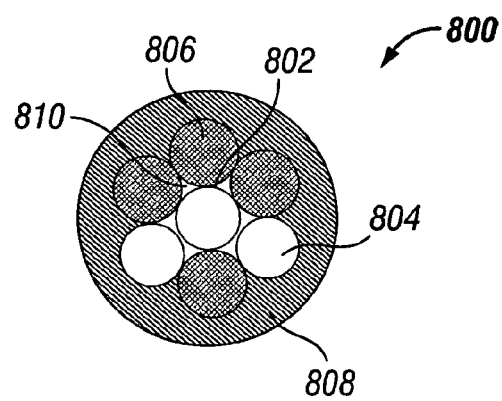
FIG. 8 is a cross-sectional view of a sixth illustrative embodiment of a cable conductor bundle according to the present invention.

Referring to FIG. 8, which illustrates a sixth embodiment of the present invention, conductor bundle 800 includes a central optical fiber 802 positioned on the central axis of the conductor bundle 800. One or more optical fibers 804 (only one indicated) and a plurality of metal conductors 806 (only one indicated) are positioned helically around the central optical fiber 802. The conductor bundle further includes polymeric insulation material filler 808. The interstitial space 810 formed between the central optical fiber 802, the metal conductors 806, and optical fibers 804, may further be filled with an interstitial filler. The conductor bundle 800 may be employed in cable configuration as central and outer conductor bundles.

Figure 9:
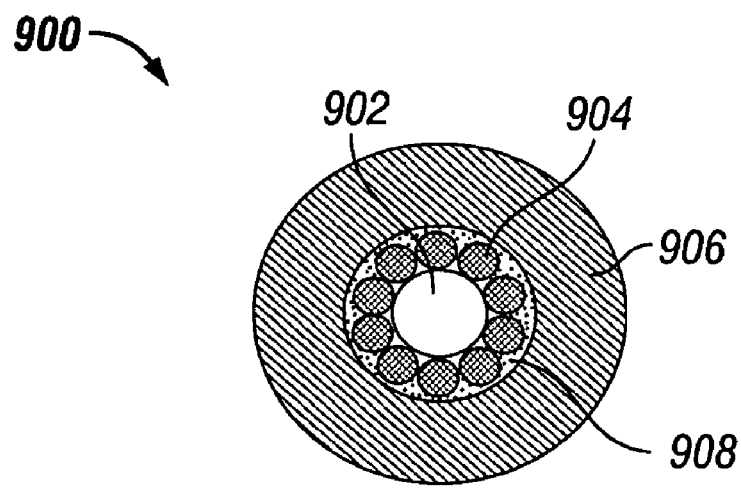
FIG. 9 is a cross-sectional view of a seventh illustrative embodiment of a cable conductor bundle according to the present invention.

FIG. 9 depicts, in cross-section, a seventh illustrative embodiment of the present invention. The conductor bundle 900 may include any combination of optical fibers 902, metallic conductors 904 (only one indicated), polymeric insulating material 906, or other components according to the invention. Further, the conductor bundle 900 includes a jacket 908 placed around the outer periphery of the metallic conductors 904. The jacket 908 may become part of the conductor and also protects the fiber optics from hydrogen, water and other chemical attack. The jacket 908 may be an extrusion of tin and gold alloy solder, any other extrudable metal or metal alloy, or a metallic wrap. The jacket 908 may also be a welded metallic tube that is drawn and shaped around the outer periphery of the metallic conductors 904. Carbon nanotubes may also be deposited over the jacket 908 as further protection against hydrogen attack. Further, when a metallic wrap forms the jacket 908, the seams of the metallic wrap may be overlapped or crimped for additional protection against water and chemical incursion. The polymer insulation material 906 is extruded over the jacket 908 to create a fiber optic and electrically insulated conductor. The jacket 908 can be included in any conductor bundle of the present invention.

Figure 10:
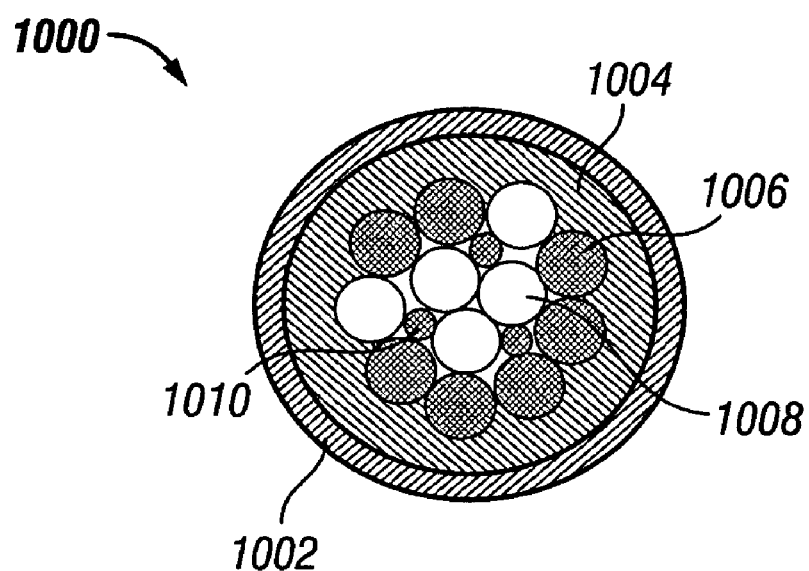
FIG. 10 is a cross-sectional view of an eighth illustrative embodiment of a cable conductor bundle according to the present invention.

Referring to FIG. 10, which illustrates an eighth embodiment of the present invention. The conductor bundle 1000 according to the present invention may further include a jacket encasement 1002 encasing the polymeric insulating material 1004, where the jacket encasement 1002 provides further protection for the conductor bundle 1000. The conductor bundle can include metallic conductors 1006 (only one indicated), optical fibers 1008 (only one indicated), interstitial fillers 1010 (only one indicated), a polymeric insulating material 1004, or any other components in accordance with the invention. Copper or other metallic tape may be used to form the jacket encasement 1002. The jacket encasement 1002 may also be an extrusion of tin and gold alloy solder, any other extrudable metal or metal alloy, or welded metallic tube that is drawn and shaped around the outer periphery of the polymeric insulating material 1004. When metallic tape is used, the seams of the tape may optionally be overlapped or crimped, and the outer surface of tape may be coated to enhance sealing properties.

It may also be desirable in certain situations to serve an additional layer of metallic conductors over the outer conductors of a conductor bundle. The additional layer of conductors may be positioned in the same direction or opposite direction as the outer layer. The additional layer of conductors may be positioned at zero lay angle, or any suitable lay angle.

While particular cable and conductor bundle configurations have been presented herein, cables and conductor bundles having other quantities and configurations of conductors and conductor bundles are within the scope of the present invention. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A cable comprising a plurality of conductor bundles, wherein each of said conductor bundles comprises:
    at least one optical fiber positioned either centrally or helically about the center axis of said conductor bundle;
    at least one metallic conductor helically positioned around said center axis of said conductor bundle; and
    one or more polymeric insulation materials disposed about said optical fiber and metallic conductor.

2. A cable according to claim 1, wherein said optical fiber is either single-mode fiber or multiple-mode fiber.

3. A cable according to claim 1, wherein said optical fiber is hermetically coated.

4. A cable according to claim 1, wherein said metallic conductors are copper conductors.

5. A cable according to claim 1, further comprising one or more helically positioned optical fibers dispersed about the cable.

6. A cable according to claim 1, further comprising one or more interstitial fillers.

7. A cable according to claim 1, further comprising at least one flat shaped metallic conductor.

8. A cable according to claim 1, wherein at least one of said conductor bundles has a central metallic conductor positioned centrally upon the center axis of said conductor bundle.

9. A cable according to claim 1, wherein at least one of said conductor bundles has a central optical fiber positioned centrally upon the center axis of said conductor bundle, and at least one optical fiber positioned helically about the center axis of said conductor bundle.

10. A cable according to claim 1, wherein at least one of said conductor bundles further comprises a jacket placed around the outer periphery of said metallic conductors and/or optical fibers.

11. A cable according to claim 1, wherein at least one of said conductor bundles further comprises a jacket encasement placed around the outer periphery of said polymeric insulating material.

12. A cable according to claim 1 as deployed downhole in oilfield wireline operations.

13. A cable according to claim 1 as deployed in seismic operations.

* * * * *